April 12, 1932.  E. C. HERTHEL ET AL  1,853,614
ART OF CRACKING HYDROCARBONS
Filed Sept. 14, 1928
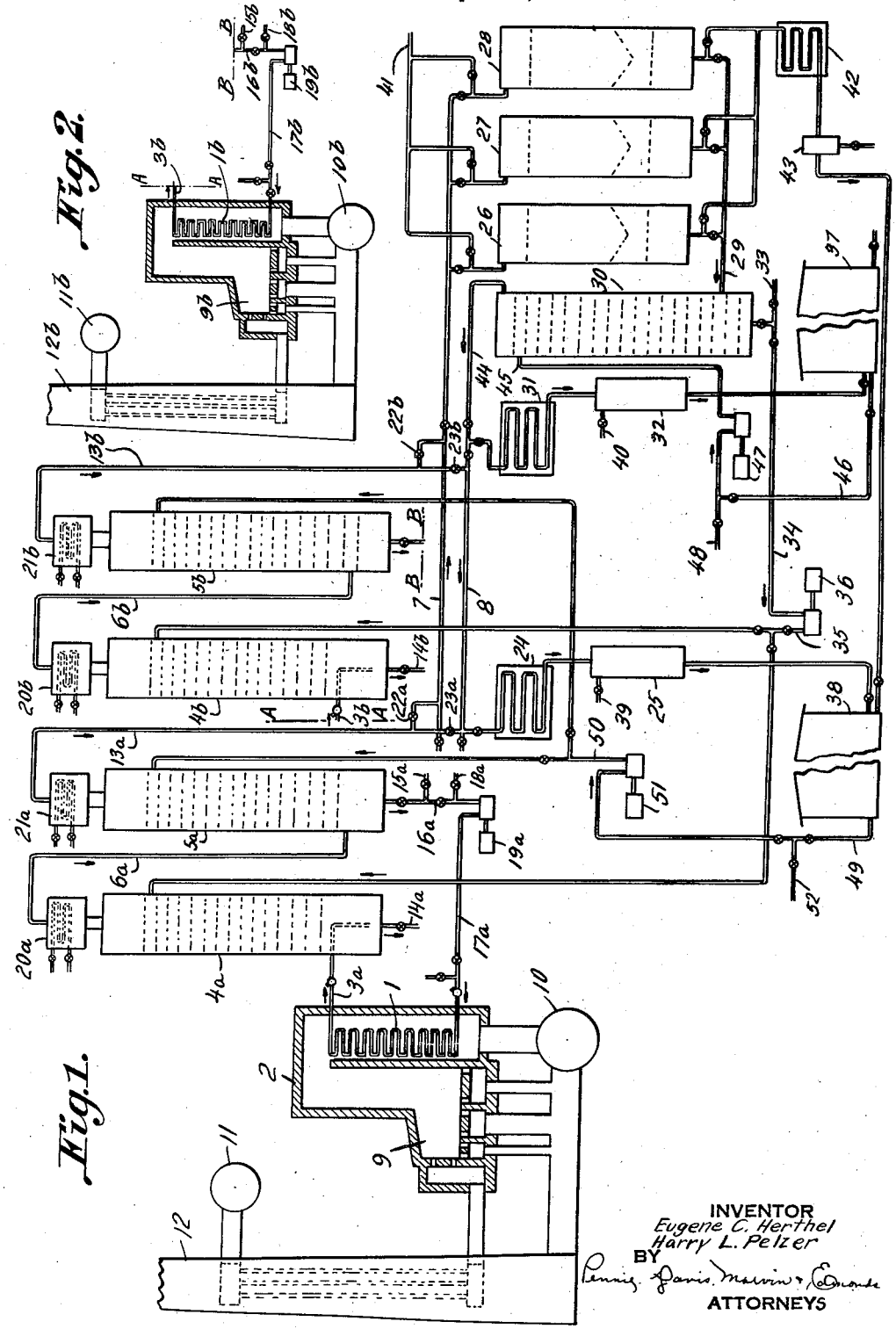
INVENTOR
Eugene C. Herthel
Harry L. Pelzer
BY
ATTORNEYS Patented Apr. 12, 1932

1,853,614

UNITED STATES PATENT OFFICE

EUGENE C. HERTHEL, OF CHICAGO, ILLINOIS, AND HARRY L. PELZER, OF HIGHLAND, INDIANA, ASSIGNORS, BY MESNE ASSIGNMENTS, TO THE GRAY PROCESSES CORPORATION, OF NEWARK, NEW JERSEY, A CORPORATION OF DELAWARE

ART OF CRACKING HYDROCARBONS

Application filed September 14, 1928. Serial No. 305,903.

This invention relates to improvements in the manufacture of gasoline; more particularly the invention relates to improvements in the combined cracking of oil in vapor phase under severe cracking conditions to produce motor fuel gasoline and refining of the thus produced gasoline by passage through an adsorptive catalyst in vapor phase.

When raw cracked gasoline or a fraction containing raw cracked gasoline, particularly gasoline produced by severe vapor phase cracking, is passed in vapor phase through an adsorptive catalyst such as fuller's earth, certain unsaturated constitutents such as the di-olefines, to the extent that they are present, are polymerized to form higher boiling polymers. This reaction affords a means of separating such constituents without involving loss of other unsaturated constituents of special value as components of motor fuel gasoline. The separation of the polymers produced by the vapor-catalyst contact is usually accomplished by fractional condensation, liquefaction, either in the refining operation proper or in some subsequent fractionating operation.

This general method has been employed with considerable success where the proportion of polymers produced in the refining operation approximates 1/2–1% by liquid volume of the gasoline product after separation of such polymers, but the raw product from severe vapor phase cracking operations frequently contains unsaturated constituents reacting with the adsorptive catalyst in amounts so large that the proportion of polymers produced is as much as 10–11% by liquid volume of the gasoline product after separation of such polymers, that is the refining operation must accommodate an amount of polymers ten to twenty times as great as the amount usually produced.

As applied to this type of raw cracked gasoline, the useful period of activity of the adsorptive catalyst becomes of controlling importance because the radically increased production of polymers radically shortens the useful period of activity of the adsorptive catalyst. Such decrease in the useful period of activity of the adsorptive catalyst not only increases the expense of supplying or revivifying the catalyst but also increases the expense of handling the catalyst and the loss of operating time involved in replacing spent catalyst with fresh catalyst.

Where a group of vapor phase cracking systems are operated concurrently, certain advantages can be secured by treating the raw cracked products from all of the systems of the group in a common refining operation. The apparatus required is simpler and usually less expensive and the operation is more economical than where a separate refining operation is embodied in each of the separate cracking systems. The mere connection of a number of cracking systems as a batery to a common refining system, however, imposes added burdens on the adsorptive catalyst used in the refining operation which tend further to shorten its useful period of activity.

The present invention provides an improved combined operation in which the raw cracked products from a group of concurrently operated vapor phase cracking systems are refined by passage through an adsorptive catalyst in vapor phase in a common refining operation in which the period of activity of the adsorptive catalyst is maintained at a maximum. The invention also includes an improved apparatus for carrying out this type of refining operation.

According to the present invention, the raw cracked products from a group of vapor phase cracking systems are passed through an adsorptive catalyst in vapor phase in a common refining operation, but the raw cracked product from any one cracking system of the group is passed through the common refining operation only when that cracking system is in normal operation producing the normal raw cracked product, and the refined cracked products which have passed through the common refining operation are completely isolated from cracked products which have not passed therethrough. The adsorptive catalyst is thus used solely to effect the finished refining of the desired product and its useful period of activity is thus maintained at a maximum. The useful period of activity of the adsorptive catalyst is further prolonged by the maintenance of uniform operating conditions in the refining operation.

As any one vapor phase cracking system of the group is being brought into operation, the raw cracked products therefrom are separately discharged without being passed through the refining operation, and the raw cracked products from this system are passed through the refining operation only after the cracking system is in normal operation. Before any one of the cracking systems of the group is shut down, passage of the cracked products therefrom through the refining operation is stopped and these cracked products are separately discharged during the shutdown period. The separately discharged cracked products, moreover, are completely isolated from the refined products which have passed through the common refining operation. This prolongs the useful period of activity of the adsorptive catalyst in part in that it avoids any necessity for retreating a product contaminated, by passage through a common vapor line or common condenser or a common condensate line, for example, with constituents removed by the refining operation.

The separately discharged cracked products, however, in accordance with the invention, may also be passed through the common refining operation in a manner avoiding any abnormal burden upon the adsorptive catalyst.

The invention will be described in connection with the accompanying drawings which illustrate, diagrammatically and conventionally, one form of apparatus embodying the invention and adapted for carrying out the process of the invention, but it is intended and will be understood that this detailed descripton and illustration are by way of exemplification.

Fig. 1 of the drawings illustrates two vapor phase cracking systems with refining towers, condensers and connections therebetween in which corresponding parts of the two systems are identified by the same reference numerals with the letter "a" or "b" appended thereto. The heating coil and furnace are omitted from one of the systems, however, to avoid unnecessary confusion.

Fig. 2 of the drawings illustrates the heating coil and furnace of a second vapor phase cracking system adapted to be associated with the apparatus illustrated in Fig. 1 by connecting the lines 3b and 16b as shown at A—A and B—B. The heating coil and furnace illustrated in Fig. 2 are identical with that illustrated in Fig. 1 and therefore are not separately described.

Referring to Fig. 1 of the drawings, each of the cracking systems in the apparatus illustrated includes a heating conduit 1 arranged in a heating furnace 2 in which the vapor phase cracking operation proper is carried out. The heating furnace 2 comprises a firebox 9 communicating with the upper end of the heating flue in which the heating conduit 1 is arranged and a fan 10 for withdrawing heating gases from the lower end of this heating flue and for recirculating part of the heating gases therethrough by means of the several branch connections shown and for discharging the balance through the stack 12. Fan 11 is provided for supplying the air required for combustion through a preheating heat exchanger in the stack 12.

In the heating conduit in the apparatus illustrated, the oil may be heated to a discharge temperature approximating, for example, 1000–1100° F. The oil may be supplied to the heating conduit under a pressure just sufficient to force the oil and the oil products through the heating conduit and through the rest of the apparatus, 60–80 pounds per square inch, for example.

The oil products from the heating conduit of each cracking system are discharged through connections 3a, 3b, etc. To simplify the drawings, but one heating conduit and heating furnace are shown thereon, but it will be understood that each of the cracking systems of the group in the apparatus illustrated includes such a heating conduit and heating furnace similarly arranged and similarly connected.

Other types of vapor phase cracking apparatus may be used in carrying out the invention; for example that described in an application filed June 13, 1927, by Harry L. Pelzer, Serial No. 198,621.

Each of the cracking systems in the apparatus illustrated also includes a scrubbing tower 4a, 4b, etc. for the separation of tar and tarry matter and a reflux tower or fractionating tower 5a, 5b, etc. The hot oil products from each heating conduit are discharged into the lower end of the connected scrubbing tower through a liquid pool of tar maintained therein, the vapors escaping from the upper end of the scrubbing tower are discharged into the lower end of the reflux tower or fractionating tower through connections 6a, 6b, etc., and the vapors escaping from the upper end of the reflux tower or fractionating tower are discharged into one or the other of a pair of manifolds 7 and 8, through connections 13a, 13b, etc. Tar and tarry matter are discharged from the lower ends of the scrubbing towers through connections 14a, 14b, etc. Oil constituents heavier than suitable as components of the desired product are condensed in the towers 5a, 5b, etc. These condensates may be discharged through connections 15a, etc. or, in whole or in part, may be supplied to the connected heating conduits through connections 16a, etc., 17a, etc., together with raw oil supplied through connections 18a, etc. by means of pump 19a, etc.

The operation of each scrubbing tower and of each fractionating tower or reflux tower may be controlled or in part controlled by means of dephlegmators 20a, 20b, etc. mounted on towers 5a, 5b, etc. Water or other extraneous cooling medium or the raw oil or part of the raw oil to be supplied to the operation may be circulated through appropriate cooling coils in these dephlegmators and the operation of the towers controlled by regulating the rate of circulation of the cooling medium therethrough. These dephlegmators may be made a unitary part of the tower structure proper or they may be dispensed with and refluxing provided, for example, by the direct introduction of a refluxing agent.

In operation to produce motor fuel gasoline, the vapor discharge temperature from towers 4a, 4b, etc. may be maintained in the neighborhood of 500–550° F. and the vapor discharge temperature from towers 5a, 5b, etc. in the neighborhood of 400–450° F., for example.

The towers 4a, 4b, etc. may be of open baffle construction or of the so-called "bubble" plate construction, for example. The towers 5a, 5b, etc. are with advantage of bubble plate construction, or other construction adapted to secure close fractionation. These towers and dephlegmators as well as the hot connections between them are with advantage lagged or thermally insulated to minimize heat loss and to asist in maintaining close control of the operation.

The vapor connections 13a, 13b, etc. are each connected to the manifold 7 through valves 22a, 22b, etc. and to the manifold 8 through valves 23a, 23b, etc. The manifold 8 is connected to a condenser 24 arranged to discharge into a receiver 25. This condenser 24 may be termed a "dirty" condenser. The manifold 7 is connected to the upper end of each of a series of refining towers 26, 27 and 28, through appropriate valved branch connections, and the lower end of each of these refining towers is connected, through appropriate valved branch connections, to a connection 29 discharging into the fractionating tower 30. The upper end of this fractionating tower 30 is connected to a condenser 31 arranged to discharge into a receiver 32. This condenser 31 may be termed a "clean" condenser.

The fractionating tower 30 is with advantage of bubble plate construction, or other construction adapted to secure close fractionation. The liquid material separated in the fractionating tower 30 is either discharged through connection 33 or, in whole or in part, is introduced into the upper end of the scrubbing towers 4a, 4b, etc. as a refluxing agent through connections 34 and 35 by means of pump 36. The receiver 32 is connected to a run down tank 37 for storage of the refined cracked product and the receiver 25 is connected to a run down tank 38 for storage of the unrefined cracked product. Uncondensed vapors and gases are discharged from the receivers 25 and 32 through connections 39 and 40 respectively.

A charge of a suitable adsorptive catalyst, for example fuller's earth of 40–60 or 60–80 mesh, is, in operation, supported upon a foraminous partition in each of the refining towers 26, 27 and 28.

Steam for steaming out the refining towers when they are cut out of operation is supplied through connection 41 and, during the steaming out period, vapors are discharged through a condenser 42 and the resulting condensate through a water separator 43, the condensate then being discharged into the run down tank 38.

For the production of a gasoline of 400–410° F. end boiling point, for example, the vapor discharge temperature from tower 30 may be maintained in the neighborhood of 300–350° F., for example.

The operation of tower 30 may be controlled by the regulated introduction of a refluxing agent through connection 45. A part of the refined cracked product, for example, may be so supplied to the upper end of tower 30 as a refluxing agent through connections 46 and 45 by means of pump 47, or some other refluxing agent, a refined gasoline of corresponding boiling range from some other operation, for example, may be so supplied as a refluxing agent through connections 48 and 45 by means of pump 47.

In carrying out the invention in the apparatus illustrated, the raw cracked vapors including the vapors of the gasoline product from each of the vapor phase cracking systems of the group, when in normal operation, are passed through the adsorptive catalyst in the refining towers 26, 27 or 28, the refined vapors are then fractionated to separate a refined gasoline product of the desired boiling range in the fractionating tower 30, and the refined final gasoline product is condensed in condenser 31. Only vapors which have passed through the refining towers 26, 27 or 28 are permitted to enter the condenser 31 and the vapors from the several cracking systems of the group are permitted to enter the refining towers 26, 27 and 28 only during normal operation. When any cracking system of the group is being brought into operation, the vapors from that system, during the initial period of operation and until it is brought to normal operating conditions, are condensed in condenser 24 and the resulting condensate is isolated from that produced in condenser 31. After that system is brought to normal operating conditions, the vapors are passed through the refining tower and the fractionating tower 30 to the condenser 31. Similarly, when any cracking system of the group is to be shut down, the vapors from that system are first diverted through condenser 24 and the cracking system then shut down, the resulting condensate produced in condenser 24 being isolated from the condensate produced in condenser 31. The several cracking systems are cut in and cut out of the manifolds 7 and 8 by means of the valves 22a, 22b, etc., and the valves 23a, 23b, etc., respectively, to effect such transfers.

A plurality of refining towers are provided, as illustrated, to permit maintained continuity of the refining operation. Any one of the group of three illustrated, for example, can be cut out for cleaning or recharging with fresh catalyst while the other two remain in operation. When any one of the towers 26, 27 and 28 is cut out for cleaning or recharging, it is steamed out through the separate condenser 42. The resulting condensate, after separation of water, is isolated from the condensate produced in receiver 31. This condensate is with advantage handled in admixture with that produced in condenser 24. Similarly, when any one of the several vapor phase cracking systems is shut down for cleaning or repair, it is steamed out through condenser 24, and the resulting condensate is isolated from the condensate produced in condenser 31.

The unrefined cracked products condensed from vapors which have not been subjected to the refining operations, the condensate collecting in tank 38 in the apparatus illustrated, are with advantage in carrying out the invention reintroduced into fractionating or refluxing operations in the cracking system as refluxing agents, through connections 49 and 50 by means of pump 51 in the apparatus illustrated, to be revaporized therein and subjected to the refining operation in admixture with the vapors from the cracking systems during normal operation. By so returning this unrefined raw cracked material to the cracking systems it can be treated as part of the raw products discharged from the cracking systems in normal operation without loss of the constituents it contains suitable as components of the desired product and without adding to the burden on the adsorptive catalyst disproportionately with respect to the total amount of refined product produced.

Unrefined raw cracked products from other vapor phase cracking operations may also be supplied as refluxing agents to fractionating or refluxing operations in cracking systems operated in accordance with the present invention, for example as described in an application filed herewith by us, Serial No. 305,902. In the apparatus illustrated, such unrefined material or some other refluxing agent or some supplemental refluxing agent may be supplied through connections 52 and 50 by means of pump 51.

We claim:

1. In the combined vapor phase cracking of oil to produce gasoline and refining of the thus produced gasoline by passage through an adsorptive catalyst in vapor phase, the improvement which comprises concurrently conducting a plurality of vapor phase cracking operations in each of which the cracked vapors are subjected to a scrubbing operation for separation of tar and, during normal operation, subjecting the raw vapors from the scrubibng operation accompanying each vapor phase cracking operation to a common refining operation in which the vapors are passed through the adsorptive catalyst, subjecting the thus refined vapors to a common condensing operation and collecting the refined condensate, subjecting the raw vapors from each vapor phase cracking operation to a separate common condensing operation without subjecting them to the refining operation during the initial and final periods of each vapor phase cracking operation, and completely isolating the condensate and the vapors forming the condensate produced in the said separate condensing operation from the refined condensate and the vapors forming the refined condensate produced in the first mentioned condensing operation.

2. In the combined vapor phase cracking of oil to produce gasoline and refining of the thus produced gasoline by passage through an adsorptive catalyst in vapor phase, the improvement which comprises concurrently conducting a plurality of vapor phase cracking operations and, during normal operation, subjecting the raw vapors from each vapor phase cracking operation to a common refining operation in which the vapors are passed through the adsorptive catalyst, subjecting the thus refined vapors to a common condensing operation and/collecting the refined condensate, subjecting the raw vapors from each vapor phase cracking operation to a separate common condensing operation without subjecting them to the refining operation during the initial and final periods of each vapor phase cracking operation, and completely isolating the condensate and the vapors forming the condensate produced in the said separate condensing operation from the refined condensate and the vapors forming the refined condensate produced in the first mentioned condensing operation, and revaporizing condensate produced in the said separate condensing operation by direct introduction into raw vapors from the vapor phase cracking operations, during normal operation, to subject the components of this condensate to the refining operation in admixture with the raw vapors from the cracking operations.

3. In the combined vapor phase cracking of oil to produce gasoline and refining of the thus produced gasoline by passage through an adsorptive catalyst in vapor phase, the improvement which comprises concurrently conducting a plurality of vapor phase cracking operations in which the cracked vapors are subjected to refluxing operations from which reflux is returned to the cracking operations proper and, during normal operation, subjecting the raw vapors from each vapor phase cracking operation to a common refining operation in which the vapors are passed through the adsorptive catalyst, subjecting the thus refined vapors to a common condensing operation and collecting the refined condensate, subjecting the raw vapors from each vapor phase cracking operation to a separate common condensing operation without subjecting them to the refining operation during the initial and final periods of each vapor phase cracking operation, and completely isolating the condensate and the vapors forming the condensate produced in the said separate condensing operation from the refined condensate and the vapors forming the refined condensate produced in the first mentioned condensing operation, and introducing condensate produced in the said separate condensing operation directly into the said refluxing operations.

4. In the combined vapor phase cracking of oil to produce gasoline and refining of the thus produced gasoline by passage through an adsorptive catalyst in vapor phase, the improvement which comprises concurrently conducting a plurality of vapor phase cracking operations in each of which the cracked vapors are subjected to a scrubbing operation for separation of tar and, during normal operation, subjecting the raw vapors from the scrubbing operation accompanying each vapor phase cracking operation to a common refining operation in which the vapors are passed through the adsorptive catalyst, subjecting the thus refined vapors to a common condensing operation and collecting the refined condensate, subjecting the raw vapors from each vapor phase cracking operation to a separate common condensing operation without subjecting them to the refining operation during the initial and final periods of each vapor phase cracking operation, and completely isolating the condensate and the vapors forming the condensate produced in the said separate condensing operation from the refined condensate and the vapors forming the refined condensate produced in the first mentioned condensing operation, and introducing high boiling material produced in the said refining operation directly into the said scrubbing operations.

5. In the combined vapor phase cracking of oil to produce gasoline and refining of the thus produced gasoline by passage through an adsorptive catalyst in vapor phase, the improvement which comprises concurrently conducting a plurality of vapor phase cracking operations in which the cracked vapors are subjected successively to scrubbing operations for separation of tar and to refluxing operations from which reflux is returned to the cracking operations proper and, during normal operation, subjecting the raw vapors from each vapor phase cracking operation to a common refining operation in which the vapors are passed through the adsorptive catalyst, subjecting the thus refined vapors to a common condensing operation and collecting the refined condensate, subjecting the raw vapors from each vapor phase cracking operation to a separate common condensing operation without subjecting them to the refining operation during the initial and final periods of each vapor phase cracking operation, and completely isolating the condensate produced in the said separate condensing operation from the refined condensate and the vapors forming the refined condensate produced in the first mentioned condensing operation, introducing high boiling material produced in the said refining operation directly into the said scrubbing operations and introducing condensate produced in the said separate condensing operation directly into the said refluxing operations.

6. In the combined vapor phase cracking of oil to produce gasoline and refining of the thus produced gasoline by passage through an adsorptive catalyst in vapor phase, the improvement which comprises concurrently conducting a plurality of vapor phase cracking operations in each of which the cracked vapors are subjected to a scrubbing operation for separation of tar and, during normal operation, subjecting the raw vapors from the scrubbing operation accompanying each vapor phase cracking operation to a common refining operation in which the vapors are passed through the adsorptive catalyst, subjecting the thus refined vapors to a common fractionating operation and then to a common condensing operation and collecting the refined fractionated condensate, subjecting the raw vapors from each vapor phase cracking operation to a separate common condensing operation without subjecting them to the refining operation during the initial and final periods of each vapor phase cracking operation, and completely isolating the condensate and the vapors forming the condensate produced in the said separate condensing operation from the refined condensate and the vapors forming the refined condensate produced in the first mentioned condensing operation.

7. In combination in apparatus for manufacturing gasoline, a plurality of vapor phase cracking systems including means for supplying oil thereto, a refining tower adapted to receive a charge of an adsorptive catalyst and to provide for passage of vapors therethrough, two separate condensers, two separate manifolds each communicating through valved connections with each of said cracking systems, a connection between one of said manifolds and one of said condensers, a connection between the other manifold and the said refining tower and a connection between the said refining tower and the other of said condensers.

8. In combination in apparatus for manufacturing gasoline, a plurality of vapor phase cracking systems including means for supplying oil thereto and scrubbing towers through which the cracked vapors pass, a refining tower adapted to receive a charge of an adsorptive catalyst and to provide for passage of vapors therethrough, two separate condensers, two separate manifolds each communicating through valved connections with the scrubbing tower of each of said cracking systems, a connection between one of said manifolds and one of said condensers, a connection between the other manifold and the said refining tower and a connection between the said refining tower and the other of said condensers, a manifold communicating through valved connections with each of said scrubbing towers and means for supplying high boiling material produced in the said refining tower to the last mentioned manifold.

9. In combination in apparatus for manufacturing gasoline, a plurality of vapor phase cracking systems including means for supplying oil thereto and fractionating towers through which the cracked vapors pass, a refining tower adapted to receive a charge of an adsorptive catalyst and to provide for passage of vapors therethrough, two separate condensers, two separate manifolds each communicating through valved connections with the fractionating tower of each of said cracking systems, a connection between one of said manifolds and one of said condensers, a connection between the other manifold and the said refining tower and a connection between the said refining tower and the other of said condensers, a manifold communicating through valved connections with each of said fractionating towers and means for supplying condensate from the first separately mentioned condenser to the last mentioned manifold.

10. In combination in apparatus for manufacturing gasoline, a plurality of vapor phase cracking systems including means for supplying oil thereto, scrubbing towers and fractionating towers with connections adapted to permit the cracked vapors to pass in succession therethrough, a refining tower adapted to receive a charge of an adsorptive catalyst and to provide for passage of vapors therethrough, two separate condensers, two separate manifolds each communicating through valved connections with the fractionating tower of each of said cracking systems, a connection between one of said manifolds and one of said condensers, a connection between the other manifold and the said refining tower and a connection between the said refining tower and the other of said condensers, a manifold communicating through valved connections with each of said scrubbing towers and means for supplying high boiling material produced in the said refining tower thereto, and a manifold communicating through valved connections with each of said fractionating towers and means for supplying condensate from the first separately mentioned condenser thereto.

11. In combination in apparatus for manufacturing gasoline, a plurality of vapor phase cracking system including means for supplying oil thereto, scrubbing towers through which the cracked vapors pass, a refining tower adapted to receive a charge of an adsorptive catalyst and to provide for passage of vapors therethrough, two separate condensers, two separate manifolds each communicating through valved connections with the scrubbing tower of each of said cracking systems, a connection between one of said manifolds and one of said condensers, a connection between the other manifold and the said refining tower, a fractionating tower and a connection between the said refining tower and the said fractionating tower, a connection between the said fractionating tower and the other of said condensers, a manifold communicating through valved connections with each of said scrubbing towers and means for supplying high boiling material separated in the said fractionating tower to the last mentioned manifold.

In testimony whereof we affix our signatures.

EUGENE C. HERTHEL.
HARRY L. PELZER.